US009190699B2

(12) United States Patent
Granger-Jones et al.

(10) Patent No.: US 9,190,699 B2
(45) Date of Patent: Nov. 17, 2015

(54) BAND SWITCH WITH SWITCHABLE NOTCH FOR RECEIVE CARRIER AGGREGATION

(75) Inventors: Marcus Granger-Jones, Scotts Valley, CA (US); Nadim Khlat, Cugnaux (FR)

(73) Assignee: RF Micro Devices, Inc., Greensboro, NC (US)

( * ) Notice: Subject to any disclaimer, the term of this patent is extended or adjusted under 35 U.S.C. 154(b) by 569 days.

(21) Appl. No.: 13/606,139

(22) Filed: Sep. 7, 2012

(65) Prior Publication Data

US 2013/0241666 A1    Sep. 19, 2013

Related U.S. Application Data

(60) Provisional application No. 61/546,641, filed on Oct. 13, 2011, provisional application No. 61/555,263, filed on Nov. 3, 2011.

(51) Int. Cl.
*H01P 1/10* (2006.01)
*H01P 1/15* (2006.01)
*H04B 1/00* (2006.01)
*H04B 1/10* (2006.01)

(52) U.S. Cl.
CPC .. *H01P 1/15* (2013.01); *H01P 1/10* (2013.01); *H04B 1/006* (2013.01); *H04B 1/109* (2013.01); *H04B 1/1027* (2013.01); *H04B 2001/1054* (2013.01); *H04B 2001/1063* (2013.01)

(58) Field of Classification Search
CPC ....................................................... H01P 1/10
USPC .................................. 333/101, 103, 175, 176
See application file for complete search history.

(56) References Cited

U.S. PATENT DOCUMENTS

2009/0174622 A1* 7/2009 Kanou ........................ 343/876
2011/0210901 A1* 9/2011 Tikka et al. ................. 343/853
2011/0294443 A1* 12/2011 Nohra et al. ................... 455/78

* cited by examiner

*Primary Examiner* — Stephen E Jones
(74) *Attorney, Agent, or Firm* — Withrow & Terranova, P.L.L.C.

(57) ABSTRACT

A band switch with a switchable notch for receive carrier aggregation is disclosed. The band switch has at least one input and an output with at least one series switch coupled between the at least one input and the output. The at least one series switch is adapted to selectively couple the input to the output in response to a first control signal. The band switch also includes at least one shunt switch coupled between the at least one input and a voltage node. The at least one shunt switch is adapted to selectively couple the at least one input to the voltage node in response to a second control signal. In addition, at least one notch filter is selectively coupled to the output in a shunt configuration, wherein the at least one notch filter is configured to attenuate signals within a stop band to attenuate harmonics and distortion.

18 Claims, 11 Drawing Sheets

| FILTER ORDER | | | 1ST ORDER | | | | 2ND ORDER | | | SP4T | |
|---|---|---|---|---|---|---|---|---|---|---|---|
| FILTER TYPE | | | SHUNT NOTCH ON ANT. PORT W/ BYPASS ON-CHIP INDUCTORS | | | | SHUNT NOTCH ON ANT. PORT W/ BYPASS 4nH & 20nH EXT. INDUCTORS Q 60 AT 1G | | SERIES ON B17 TxRx, PORT SHUNT ON ANT. PORT | | |
| SP4T BASE | | | REF. SP4T | | REF. SP4T | | | | | | |
| MODE | | | FILLER | BYPASS | FILLER | BYPASS | FILLER | BYPASS | REF | II3 OPT. |
| S21 @ 704MHz | dB | | -0.64 | -0.51 | -0.65 | -0.5 | -0.81 | -0.61 | -0.48 | -0.43 |
| S31 at 950M (S41 & S51) | dB | | -0.71 | -0.53 | -0.7 | -0.52 | -0.73 | -0.56 | -0.48 | -0.52 |
| H3 | dBm | | -90 | -82.7 | -98.5 | -82 | -101 | -88 | -84.5 | -91.2 |
| 2112M | dB | | -7 | -0.7 | -18 | -0.7 | -21.5 | -0.72 | -0.6 | -0.6 |
| 2148M | dB | | -9 | -0.7 | -18 | -0.7 | -26 | -0.72 | -0.6 | -0.6 |

SP4T WITH NOTCH FILTER AT 2.13GHz

H3 OPT.

FIG. 4

| BAND SWITCH PERFORMANCE WITHOUT USING A NOTCH FILTER ON OUTPUT | |
|---|---|
| FTX_LB SIGNAL AT ANTENNA | +25 dBm |
| LB/HB ISOLATION IN DIPLEXER | -13 dB w/c |
| FTX_LB SIGNAL AT HB DUPLEXER PORT | +12 dBm |
| THIRD ORDER INTERCEPT POINT (IIP3) | +72 dBm |
| THIRD HARMONIC OF FTX_LB AT HB DUPLEXER PORT | -117 dBm/1MHz |
| FTX_LB SIGNAL IS ONE RESOURCE BLOCK (NARROW BAND) | -117 dBm/1Hz |

FIG. 18

| BAND SWITCH PERFORMANCE USING A NOTCH FILTER ON OUTPUT | |
|---|---|
| FTX_LB SIGNAL AT ANTENNA | +25 dBm |
| LB/HB ISOLATION IN DIPLEXER | -13 dB w/c |
| FTX_LB SIGNAL AT HB DUPLEXER PORT | +12 dBm |
| AFTER FILTERING | +7 dBm |
| THIRD ORDER INTERCEPT POINT (IIP3) | +72 dBm |
| THIRD HARMONIC OF FTX_LB AT HB DUPLEXER PORT | -132 dBm/1MHz |
| FTX_LB SIGNAL IS ONE RESOURCE BLOCK (NARROW BAND) | -192 dBm/1Hz |

FIG. 19

BAND SWITCH WITH SWITCHABLE NOTCH FOR RECEIVE CARRIER AGGREGATION

RELATED APPLICATIONS

This application claims the benefit of U.S. provisional patent application Nos. 61/546,641, filed Oct. 13, 2011, and 61/555,263, filed Nov. 3, 2011, the disclosures of which are hereby incorporated herein by reference in their entireties.

FIELD OF THE DISCLOSURE

The present disclosure relates to wireless communication and in particular to improving interoperability by reducing interference during a receive carrier aggregation operation of a wireless device.

BACKGROUND

Demands for cellular downlink data are rapidly increasing as consumers use greater numbers of data intensive applications on their wireless data devices. This trend is encouraging wireless carriers and wireless service providers to explore new ways of increasing downlink data rates. One known method for increasing downlink data rates employs receive carrier aggregation. Receive carrier aggregation allows a wireless device to simultaneously receive data using multiple downlink frequency bands to improve throughput while simultaneously transmitting on another band. Receive carrier aggregation may be either contiguous or non-contiguous. In the case of non-contiguous carrier aggregation, receive carrier aggregation may be applied either intra-band or inter-band. The present disclosure relates to non-contiguous inter-band operation where a second receive band is located at a third harmonic of a transmit frequency.

In non-contiguous inter-band operation where one of the receive bands is located at the third harmonic of the transmit frequency, the harmonics generated in a power amplifier (PA) and front end (FE) switches are not attenuated sufficiently enough to prevent receiver desensitization. Related art methods for reducing receiver desensitization due to harmonics include improving a lower band duplex filter attenuation of the third harmonic of the TX frequency, improving the diplexer low band/high band (LB/HB) isolation, and adding continuously active (i.e., static) notch filters into the TX path, and the implementation of dual feed antennas with inherent LB/HB isolation.

However, these related art methods such as adding static notch filters into the TX path introduces insertion losses that significantly reduce efficiency. Reduced efficiency adversely impacts talk time and data transfer per battery charge of wireless devices. In addition, these related art methods may not significantly attenuate harmonics and distortion on an antenna side of an RF switch. Therefore, a need remains to either reduce the harmonic distortion in components making up the PA and the FE switches and/or include additional filtering in a low frequency transmit (TX) path to attenuate the generated harmonics without significantly impacting efficiency due to insertion losses. Moreover, a notch filter needs to be configured to attenuate harmonics and distortion that are self generated by switches coupled to the notch filter and other devices such as PAs, transceiver duplexers, and the like. Further still, the attenuation provided by a notch filter should prevent significant magnitudes of harmonics and distortion from reaching an antenna.

SUMMARY

The present disclosure provides a band switch with a switchable notch for receive carrier aggregation. The band switch has at least one input and an output with at least one series switch coupled between the at least one input and the output. The at least one series switch is adapted to selectively couple the at least one input to the output in response to a first control signal. The band switch also includes at least one shunt switch coupled between the at least one input and a voltage node. The voltage node is typically at ground potential, and the at least one shunt switch is adapted to selectively couple the at least one input to the voltage node in response to a second control signal. In addition, at least one notch filter is selectively coupled to the output in a shunt configuration, wherein the at least one notch filter is configured to attenuate signals within a stop band range of frequencies.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 4 is a table that shows that between a 0.15 dB and 0.18 dB reduction in insertion loss may be achieved by disabling the notch filter compared to a related art design that has a notch filter that is always active.

FIG. 18 is a table that presents band switch performance without using a notch filter on the output.

FIG. 19 is a table that presents band switch performance using a notch filter on the output.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The present disclosure relates to a band switch with a bypass-able notch filter in a low band RF path between front end (FE) switches and an antenna or an antenna matching network. The terms "switchable" and "bypass-able" are used interchangeably herein when referring to enabling and disabling notch filters. This bypass-able notch filter is designed to attenuate a third harmonic of a low band RF transmit signal. The bypass-able notch filter can be used in systems that employ either single or dual feed antenna structures. In the case of a single feed antenna, the bypass-able notch filter would be combined with a low band single pole multi-throw (SPxT) type band switch and would be used to drive the low band port of a diplex filter. In the case of a dual feed antenna, the band switch, with bypass-able notch filter, would drive a low band feed point of the antenna. In either cases, extra impedance transformation elements or an antenna tuner may be placed between the notch filter and the antenna/diplexer.

Figure 1:
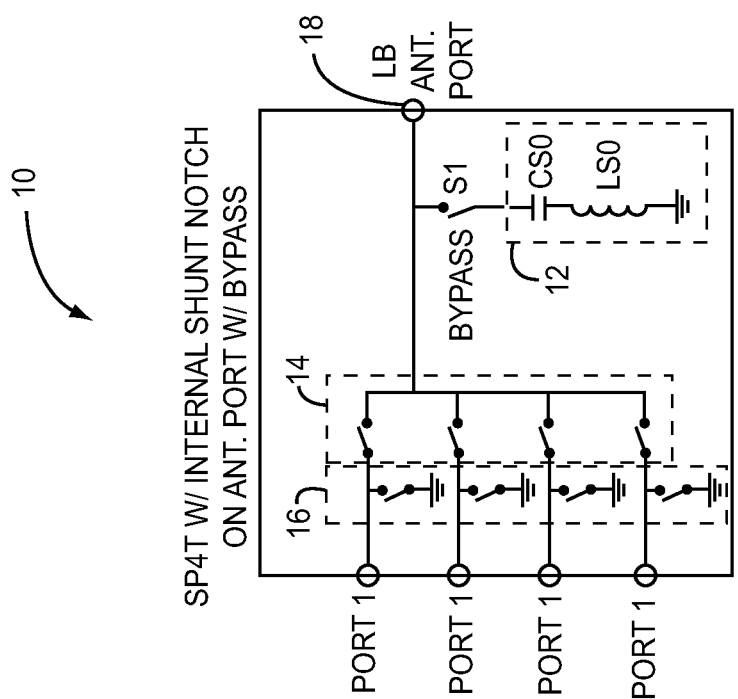
FIG. 1 is a schematic depicting one embodiment of a band switch that includes an internal notch filter that may be enabled or disabled using a combination of series switches and/or shunt switches.

FIG. 1 is a schematic depicting one embodiment of a band switch 10 that includes an internal notch filter 12 that may be enabled or disabled using a combination of series switches 14 and/or shunt switches 16. The internal notch filter 12 is integrated with the band switch 10. The band switch 10 is a single pole multi-throw (SPxT) type. For example, the series switches 14 selectively couple a plurality of RF input ports to an output port 18. In this exemplary case, the RF input ports are PORT 1 through PORT 4 and the output port 18 is usable as an LB antenna port.

The internal notch filter 12 is made up of a series capacitor CS0 and series inductor LS0. A first bypass switch S1 coupled in series with the internal notch filter 12 is usable to enable or disable the internal notch filter 12. The internal notch filter 12 is enabled when a transceiver (not shown) is being used in an inter-band carrier aggregation mode that transmits at a low band frequency while simultaneously receiving at an associated Band 17 receive frequency and when a second aggregated RX band is at the third harmonic of a transmit frequency. An exemplary low band frequency is located within Band 17, which ranges in frequency from 704 MHz to 716 MHz. An exemplary transmit frequency is within Band 4, which ranges in frequency from 2110 MHz to 2115 MHz.

The internal notch filter 12 can be disabled when it is not required by opening the bypass switch S1. For example, the internal notch filter 12 may not be required when the transceiver is not in an inter-band carrier aggregation mode, or when the third harmonic of an active RF path does not fall in one of the receive bands of the transceiver. Disabling the internal notch filter 12 reduces FE insertion loss and therefore improves the overall transmitter efficiency and receiver sensitivity.

Figure 2:
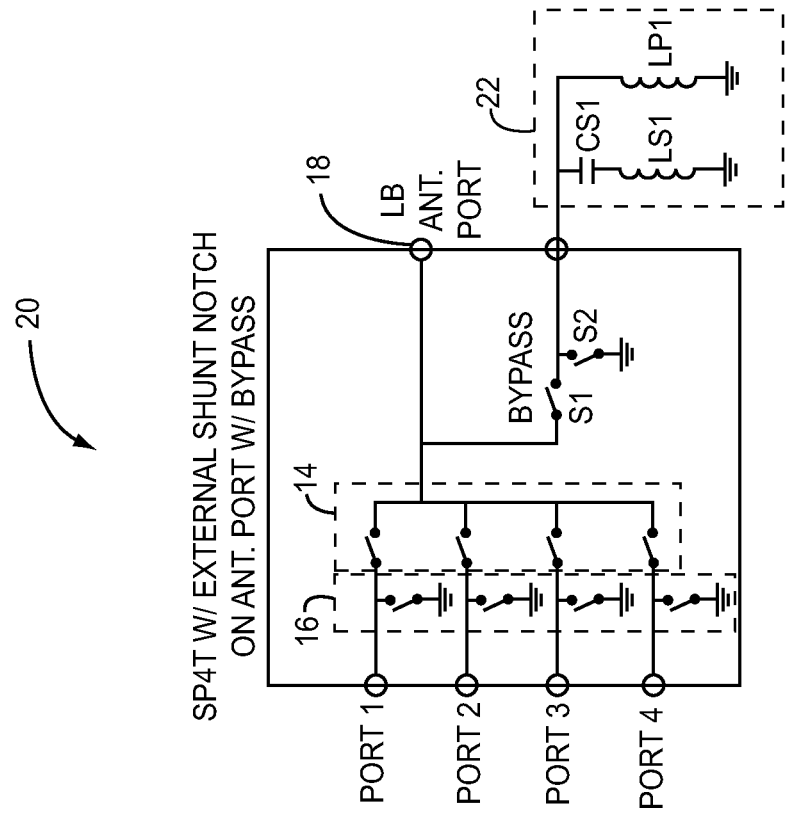
FIG. 2 is a schematic of another embodiment for a band switch that includes an external notch filter that is bypass-able by being selectively coupled to an output port.

FIG. 2 is a schematic of another embodiment for a band switch 20 that includes an external notch filter 22 that is bypass-able by being selectively coupled to the output port 18. In this exemplary case, the output port 18 is an LB antenna port that would typically be connected to either a LB input of a diplexer or a LB feed point for a dual feed antenna. In either case there could be an antenna tuner or impedance matching network between the LB antenna port and the antenna.

In this exemplary embodiment, a series inductor LS1 and a series capacitor CS1 set up a series resonance at a given band RX frequency in order to attenuate any third harmonic distortion generated by a transmit chain that includes FE switches. A parallel inductor LP1 is selected to form a low quality factor (Q) resonance at a LB transmit frequency. The parallel inductor LP1 is not essential, though the parallel inductor LP1 may be advantageous in reducing insertion loss. The first bypass switch S1 is closed and a shunt switch S2 is open when the external notch filter 22 is active. The first bypass switch S1 is open and the shunt switch S2 is closed when the external notch filter 22 is disabled. The shunt switch S2 is not strictly necessary, but the shunt switch S2 is desirable for reducing the Q of a parasitic resonance that may occur between the series capacitor CS1, the series inductor LS1, the parallel inductor LP1 and parasitic capacitances such as a capacitance across the terminals of the series switch S1. The band switch 20 may be implemented on a linear switch technology such as silicon-on-insulator (SOI), silicon-on-sapphire (SOS), or pseudomorphic high electron mobility transistor (pHemt), or with micro-electro-mechanical systems (MEMS) contact switches. The switches S1 and S2 would typically be independently controlled by a first control signal and a second control signal respectively to allow the external notch filter 22 to be enabled or disabled when any one of the RF input ports PORT 1 through PORT 4 is active.

Figure 3:
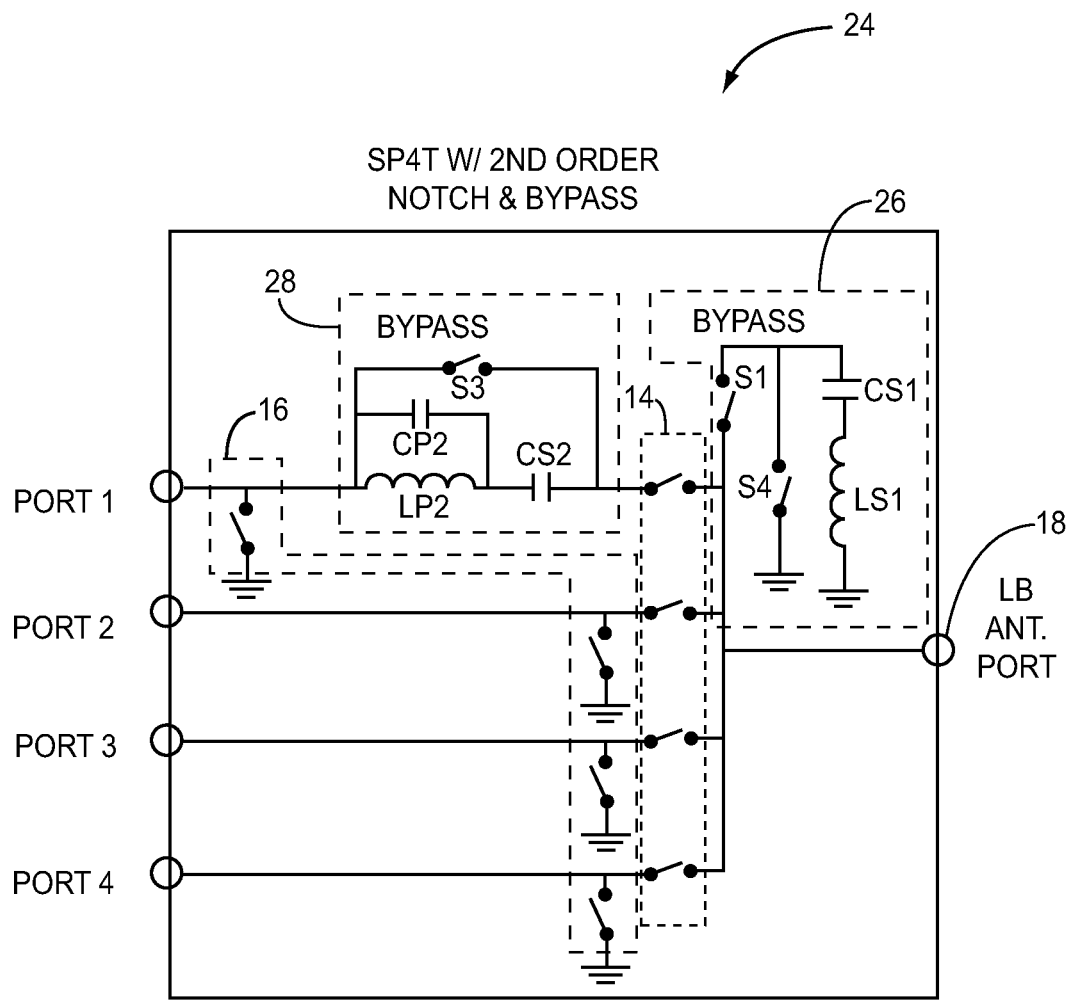
FIG. 3 is a schematic of yet another embodiment for a band switch that includes an internal notch filter that selectively provides a second order notch.

FIG. 3 is a schematic of yet another embodiment for a band switch 24 that includes an internal notch filter 26 that selectively provides a second order notch. The internal notch filter 26 is integrated with the band switch 24. A first notch filter section 28 of the internal notch filter 26 is selectively coupled from PORT 1 to the output port 18 through one of the series switches 14. The first notch filter section 28 is made up of a parallel coupling of a capacitor CP2 and an inductor LP2, both in which are in series with a capacitor CS2. As with the embodiment depicted schematically in FIG. 2, the output port 18 may be an LB antenna port that can be connected to a diplexer or LB feed point of an antenna with dual feed points and can be used with or without additional tuning components. A second notch filter section 30 is made up of the capacitor CS1 and the inductor LS1. The second notch filter section 30 is selectively coupled to the output port 18 through the first bypass switch S1. The first bypass switch S1 is closed and the shunt switch S2 is opened when the second filter section 30 is active. The series switch S1 is open and the shunt switch S2 is closed when the second filter section 30 is disabled.

In this exemplary embodiment, a ratio of LS1/CS1 and a ratio LP2/CP2 are each designed for a series/parallel resonance at a given RX frequency in order to attenuate any third harmonic distortion from the transmit chain that includes the FE switches. A typical given RX frequency would be a band 4 (B4) frequency. Note that the downlink frequency for B4 ranges from 2110 MHz to 2155 MHz. Values for the series capacitor CS2 and the shunt inductor LP1 are selected to provide resonances at a given TX frequency and also to minimize insertion loss. The capacitor CS2 and the shunt inductor LP1 are not essential, but they are desirable for reducing insertion loss. The internal notch filter 26 is designed to operate in a mode such as a band 17 (B17) mode when the band switch 24 is configured for an active RF path between PORT 1 and the output port 18, which in this case is an LB antenna port. Note that the uplink frequency range for B17 is from 734 MHz to 746 MHz. When the internal notch filter 26 is active, the first bypass switch S1 is closed and all other switches are open. When the internal notch filter 26 is disabled and PORT 1 is active, the internal notch filter 26 is bypassed by closing the shunt switch S2 and a second bypass switch S3 while leaving the first bypass switch S1 open. When PORT 1 is inactive, the internal notch filter 26 is bypassed and effectively disabled by opening the first bypass switch S1 while closing the shunt switch S2 and closing the second bypass switch S3. Disabling the internal notch filter 26 reduces the FE insertion loss, which results in an improvement in transmitter efficiency and receiver sensitivity. The first bypass switch S1 is controllable via a first control signal, the shunt switch S2 is controllable by a second control signal, and the second bypass switch S3 is controllable by a third control signal.

In this regard, FIG. 4 is a table that shows that between a 0.15 dB and 0.18 dB reduction in insertion loss may be achieved by disabling the notch filter compared to a related art design that has a notch filter that is always active. In accordance with the present disclosure switchable notch filters such as the first order internal notch filter 12 (FIG. 1), the first order external notch filter 22 (FIG. 2), and the second order internal notch filter 26 (FIG. 3) are placed after the FE switches in order to attenuate the harmonics generated by the PA and the FE switches. As shown in the table of FIG. 4, between 7 dB and 14 dB reduction in the amount of third harmonic generated by a band switch such as the band switch 10 (FIG. 1), the band switch 20 (FIG. 2), and the band switch 24 (FIG. 3) may be achieved by placing a lumped element LC filter after the band switch. The lumped element LC filter also gives approximately 15 dB attenuation of third harmonic from a PA outputting power through the band switch to an antenna. The filtering components for the lumped element LC filter can be implemented using either off-chip or on-chip components. Off-chip inductors are preferred because of their superior Q, which gives more attenuation of the third harmonic while maintaining a low in-band insertion loss. On-chip capacitors are preferred because they typically can be fabricated with a finer resolution with regard to capacitance value. Tuning of notch can be performed by using programmable capacitor arrays (PACs), which may be fabricated from SOI technology or tunable MEMs capacitors or tunable barium strontium titanate (BST) capacitors.

A notch filter resonator at the third harmonic can be a simple series LC resonator. In at least one embodiment, a second low Q resonance at the low band TX frequency can be implemented to reduce in-band insertion losses. The resonant circuit can be implemented using lumped element components or a dedicated resonator. Examples of dedicated resonators include, but are not limited to, a surface acoustical wave (SAW) device and a bulk acoustical wave device (BAW) device.

Figure 8:
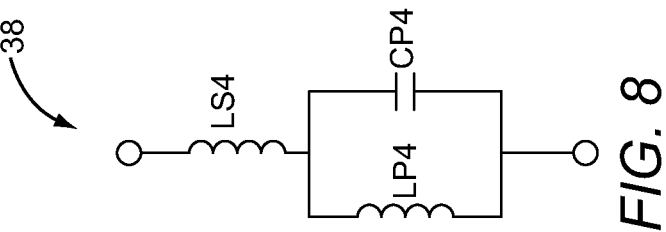
FIG. 8 is a schematic of a notch filter structure made up of a parallel combination of a lumped element inductor and a lumped element capacitor that is coupled in series with a lumped element inductor.
Figure 7:
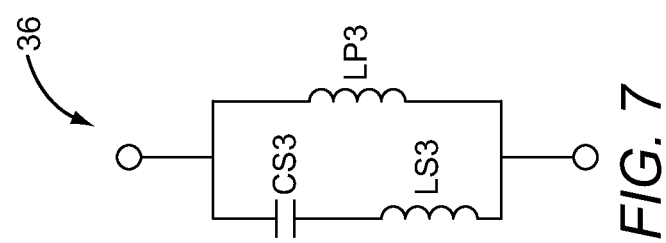
FIG. 7 is a schematic of a notch filter structure built from a modification of the simple notch filter of FIG. 6.
Figure 6:
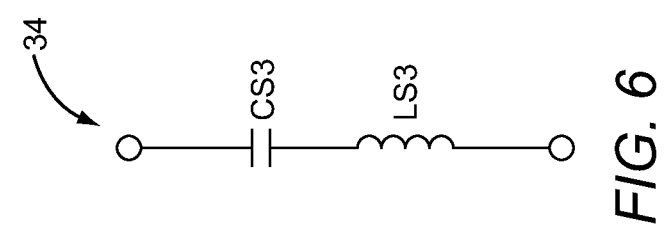
FIG. 6 depicts a simple notch structure fabricated from a lumped element capacitor and a lumped element inductor.
Figure 5:
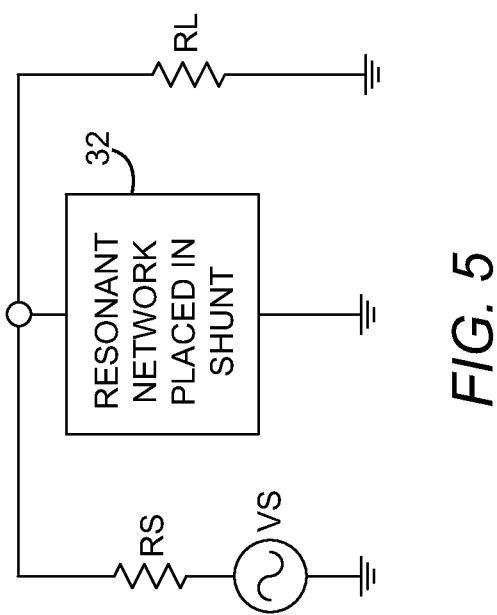
FIG. 5 is a schematic of a resonant network coupled in shunt with a load and a signal source having a series source resistance.

In this regard, FIG. 5 is a schematic of a resonant network 32 coupled in shunt with a load RL and a signal source VS having a series source resistance RS. The resonant network 32 is typically has a shunt LC lumped element structure that is tunable as a notch filter. FIG. 6 depicts a simple series notch structure 34 that is usable as the resonant network 32. The simple series notch structure is fabricated from a lumped element capacitor CS3 and a lumped element inductor LS3. FIG. 7 is a schematic of a series/parallel notch filter structure 36 that is also usable as the resonant network 32. The series/parallel notch filter structure is built from a modification of the simple notch filter 34 of FIG. 6. In this embodiment, a lumped element inductor LP3 is coupled in parallel with the series combination of the lumped element capacitor CS3 and the lumped element inductor LS3. FIG. 8 is a schematic of a parallel/series notch filter structure 38 that is also usable as the resonant network 32. The parallel/series notch structure 38 is made up of a parallel combination of a lumped element inductor LP4 and a lumped element capacitor CP4 that is coupled in series with a lumped element inductor LS4.

Figure 12:
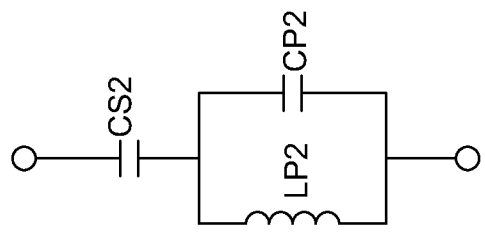
FIG. 12 is a schematic of a parallel series notch filter structure made up of a parallel combination of a lumped element inductor and a lumped element capacitor that is coupled in series with another lumped element capacitor.
Figure 11:
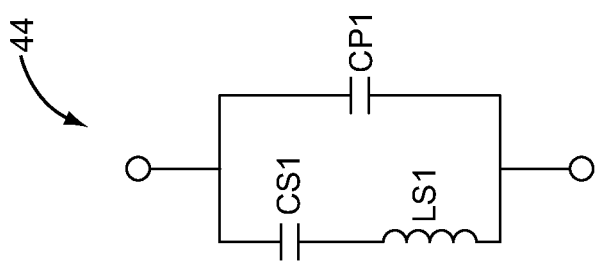
FIG. 11 is a schematic of a series parallel notch filter structure built from a lumped element capacitor coupled in parallel with the series combination of another lumped element capacitor and a lumped element inductor.
Figure 10:
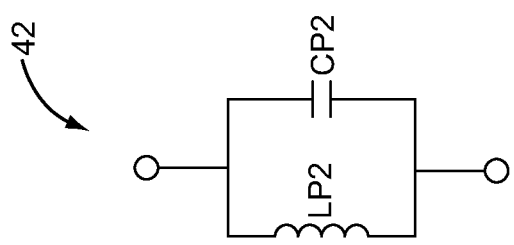
FIG. 10 depicts a simple parallel notch structure fabricated from a lumped element capacitor and a lumped element inductor.
Figure 9:
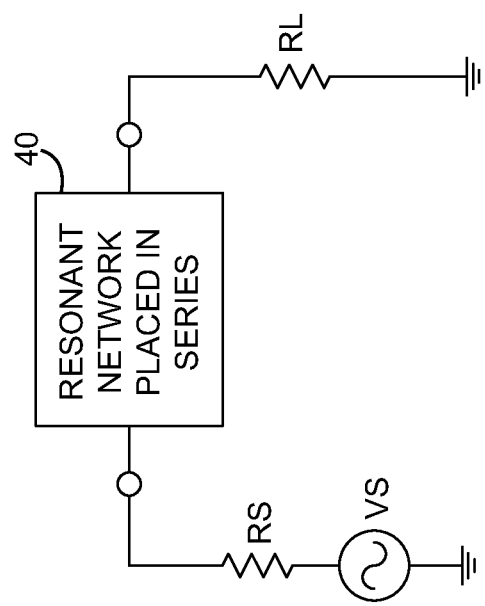
FIG. 9 is a schematic of a series resonant network coupled in series with a load and a signal source having a series source resistance.

FIG. 9 is a schematic of a series resonant network 40 coupled in series with the load RL and the signal source VS having the series source resistance RS. FIG. 10 depicts a simple parallel notch structure 42 that is usable as the series resonant network 40. The simple parallel notch structure 42 is fabricated from a lumped element capacitor CP2 and a lumped element inductor LP2. FIG. 11 is a schematic of a series/parallel notch filter structure 44 that is also usable as the series resonant network 40. The series/parallel notch filter is built from a lumped element capacitor CP1 coupled in parallel with the series combination of the lumped element capacitor CS1 and the lumped element inductor LS1. FIG. 12 is a schematic of a parallel/series notch filter structure 46 that is also usable as the series resonant network 40. The parallel/series notch filter is made up of a parallel combination of the lumped element inductor LP2 and the lumped element capacitor CP2 that is coupled in series with the lumped element capacitor CS2.

Figure 13:
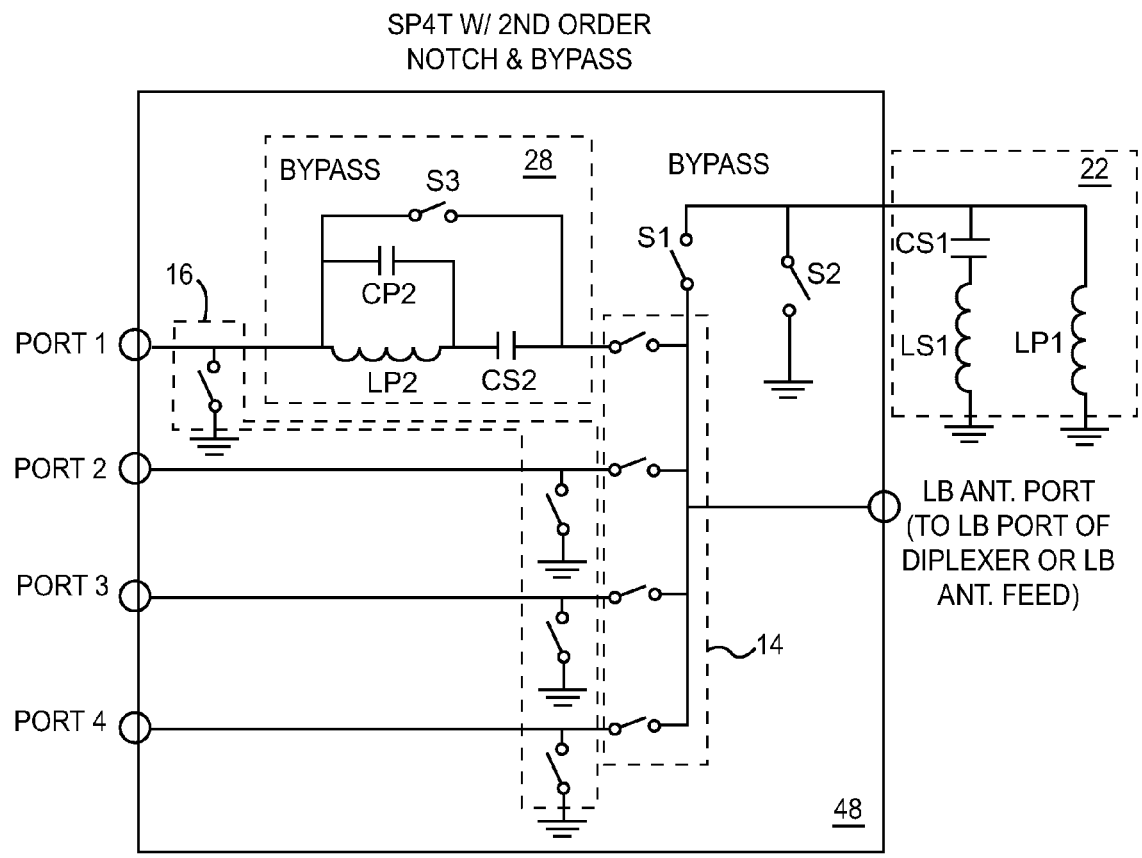
FIG. 13 is a schematic of yet another embodiment for a band switch 48 that combines features from the embodiments depicted schematically in FIG. 2 and FIG. 3.

If additional filtering is desired, the order of the switchable notch filter may be increased by adding another stage prior to a FE switch. FIG. 13 is a schematic of yet another embodiment for a band switch 48 that combines features from the embodiments depicted schematically in FIG. 2 and FIG. 3. In particular, the band switch 48 includes the external notch filter section 22 that is selectively coupled from PORT 1 to the output port 18 through one of the series switches 14. The first notch filter section 28 remains as depicted in FIG. 3 being made up of a parallel coupling of the capacitor CP2, and the inductor LP2, both in which are in series with the capacitor CS2. As with the embodiment of FIG. 2, the output port 18 may be an LB antenna port that can be connected to a diplexer or LB feed point of an antenna with dual feed points and can be used with or without additional tuning components. The external notch filter section 22 is made up of the series combination of the capacitor CS1 and the inductor LS1 coupled in parallel with the parallel inductor LP1. The external notch filter section 22 is selectively coupled to the output port 18 through the first bypass switch S1. The first bypass switch S1 is closed and the shunt switch S2 is opened when the external notch filter section 22 is active. The series switch S1 is open and the shunt switch S2 is closed when the second filter section 30 is disabled.

The first notch filter section 28 may be required in order to attenuate high levels of harmonics from the PA and other components earlier in the transmit chain. The first notch filter section 28 only appears in the low band (e.g., band 17) path and does not present any additional loading to any of the other RF paths when they are active when compared to the single stage embodiments depicted in FIG. 1 and FIG. 2. In contrast, this second order notch filter approach gives additional filtering to third harmonics from the PA, but comes at an expense of increased insertion loss in the B17 RF path. The insertion loss for the other paths is not significantly affected as shown by the Table of FIG. 4. The external notch filter section 22 on the output port of the band switch 48 attenuates the third harmonic distortion from both the first notch filter section 28 and series switches 14 and the shunt switches 16. The attenuation of the harmonics generated by the band switch 48 would be significantly reduced if the external notch filter section 22 was placed on the PORT 1 through PORT 4 side of the band switch 48. As a result, harmonics generated by the band switch 48 would likely cause a device employing such a configuration to fail regulatory spectrum requirements. Thus, the external notch filter section 22 should remain coupled to the output port 18 during RF transmissions through output port 18. The external notch filter section 22 is made bypass-able via the first bypass switch S1 in order to disable the filter when not required.

Generally, the design requirements for the first notch filter section 28 and the external notch filter section 22 are to reduce the overall level of third harmonic to less than −108 dBm at the receive port of a given RF band such as band 4. The present disclosure considers the third harmonics signals generated within a power amplifier and within FE switches. However, there are other harmonic contributors that not accounted for. For example, these other contributors may be, but are not limited to B17 duplexers and the mechanical antenna connectors along with the passive elements surface mount device (SMD) components used for impedance matching.

Figure 14:
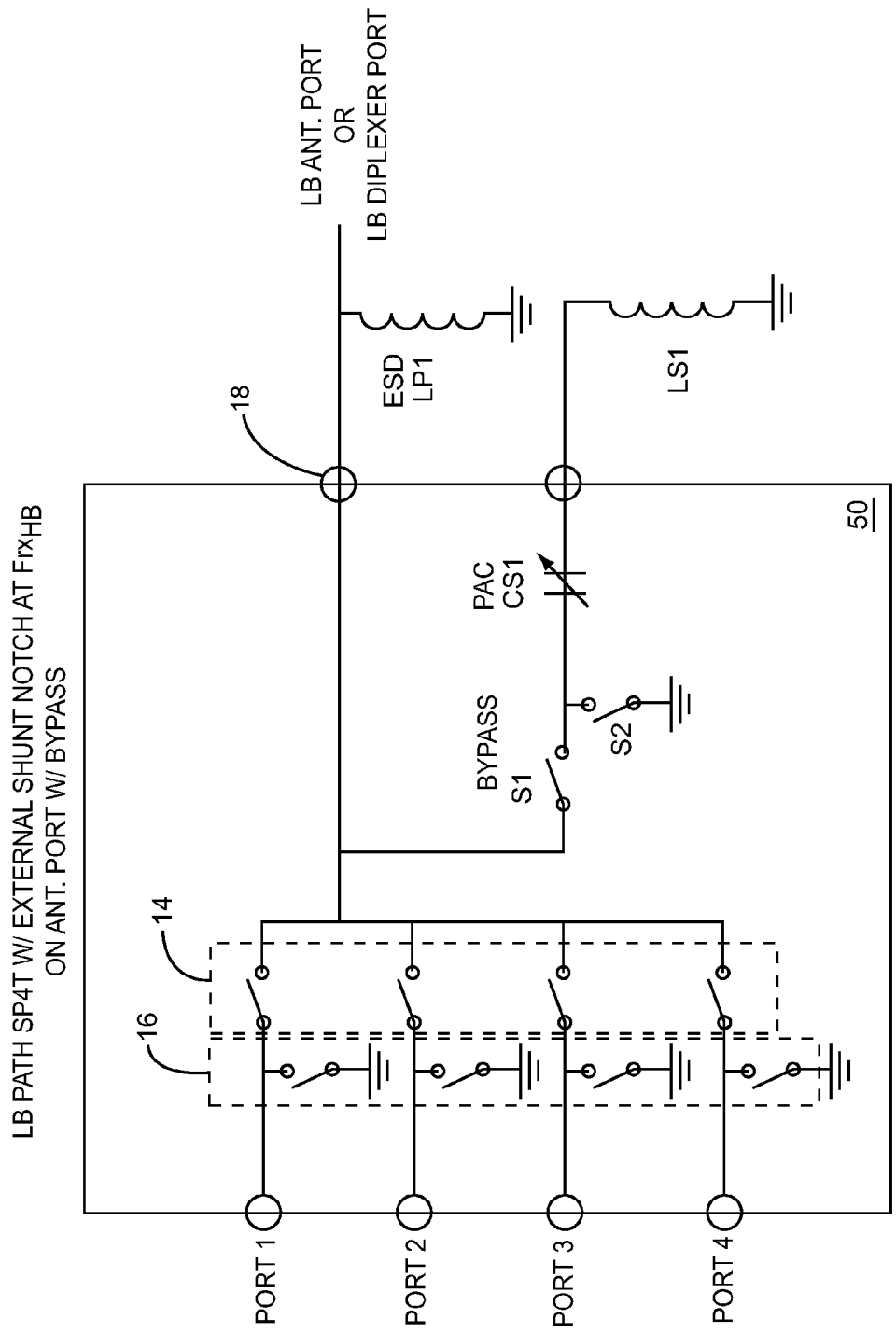
FIG. 14 is a schematic of a band switch in which setting the notch frequency of the low band third harmonic notch may be performed by making the series capacitor tunable.

FIG. 14 is a schematic of a band switch 50 in which setting the notch frequency of the low band third harmonic notch may be performed by making the series capacitor CS1 tunable. For example, the capacitor CS1 may be implemented as a programmable array of capacitors (PAC) that are digitally controlled and implemented on either SOI complementary metal oxide semiconductor (CMOS) or SOS CMOS. The digitally controlled PAC making up CS1 has the benefit of having a very high dynamic range and being implemented on the same technology as the band switch 50. Alternative implementations for the capacitor CS1 may be tunable MEMs capacitors or tunable BST capacitors.

In one embodiment, the band switch 50 may be implemented as an LC product that is calibrated during factory phasing to generate a digital tuning word that is stored in memory of the phone incorporating the band switch 50. If the band switch 50 is sold as a module with internal resonating components then the calibration would be generated during final testing. At this point the digital tuning word may be stored on-chip using an electronic fuse (e-fuse) technology.

In this and other embodiments, filter tuning elements may be added to relax the tolerance requirement on the inductor and capacitor values may be provided. Antenna ESD protection and notch filter function may be merged together by placing the shunt resonating inductor LP1 between the antenna port and ground. In general, a bypass-able notch filter may be added at the low band TX frequency, prior to the FE switch, on the high band antenna port when using a dual feed antenna. Moreover, a bypass-able notch filter may be added at the low band TX frequency prior to the FE switch, on the high band output of the HB/LB diplexer when using a single feed antenna.

Figure 15:
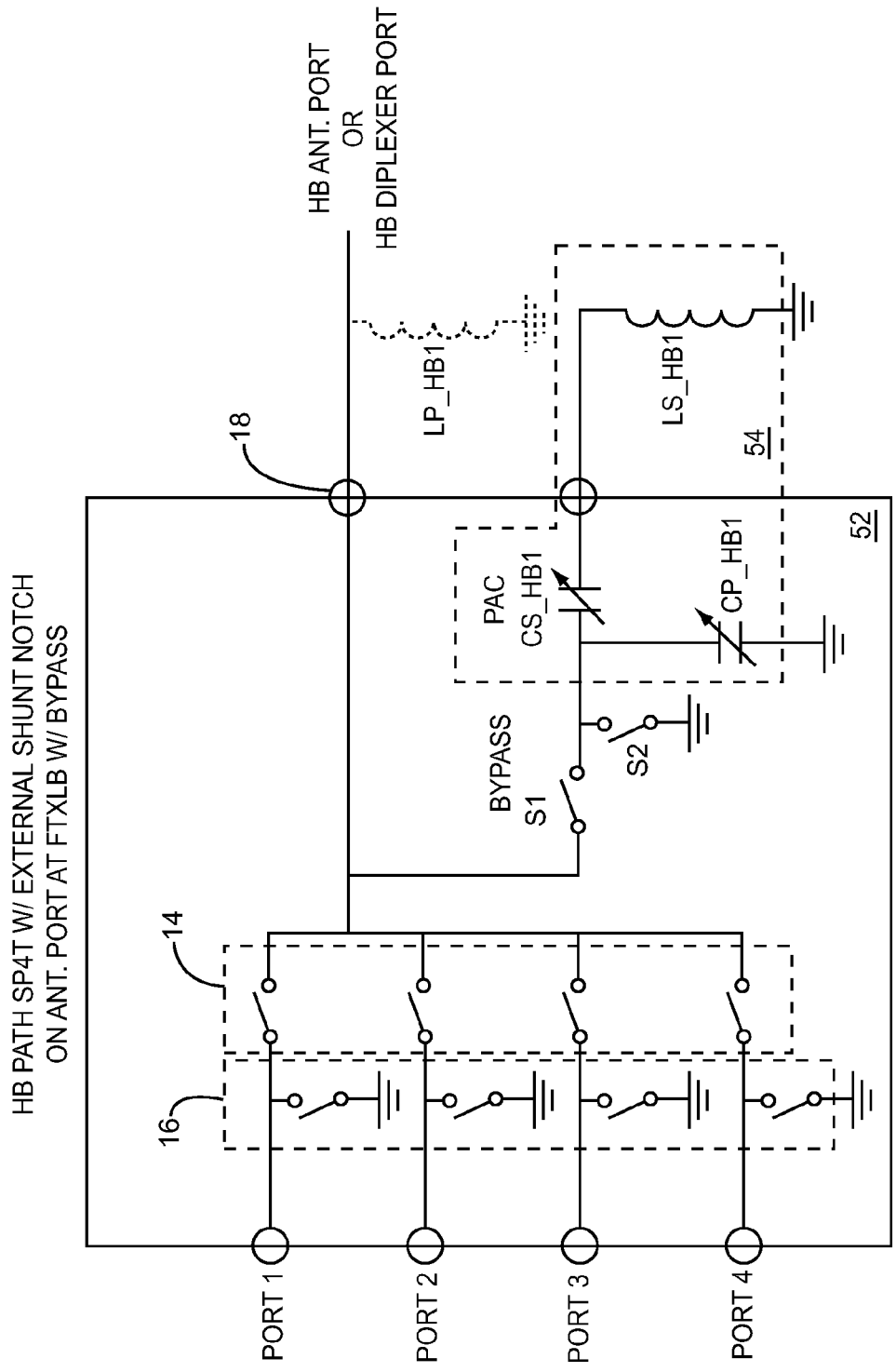
FIG. 15 is a schematic of yet another band switch that provides a selective HB path with a partially external shunt notch filter made up of a tunable series capacitor coupled in series with an external series inductor.

FIG. 15 is a schematic of yet another band switch 52 that provides a selective HB path with a partially external shunt notch filter 54 made up of a tunable series capacitor CS_HB1 coupled in series with an external series inductor LS_HB1. Also included is a tunable shunt capacitor CP_HB1. As with the embodiment of FIG. 14, the capacitor CS_HB1 and the capacitor CP_HB1 may be implemented as digitally controlled PACs that are implemented on either SOI CMOS or SOS CMOS. The digitally controlled PACs making up CS_HB1 and CP_HB1 have the benefit of having a very high dynamic range and being implemented on the same technology as the band switch 52. Alternative implementations for the capacitors CS_HB1 and CP_HB1 may be tunable MEMs capacitors or tunable BST capacitors. In this exemplary case, the output port 18 is usable as a HB antenna port or a HB diplexer port. An optional shunt inductor LP_HB1 may be coupled to the output port 18 to provide additional filtering.

Figure 16:
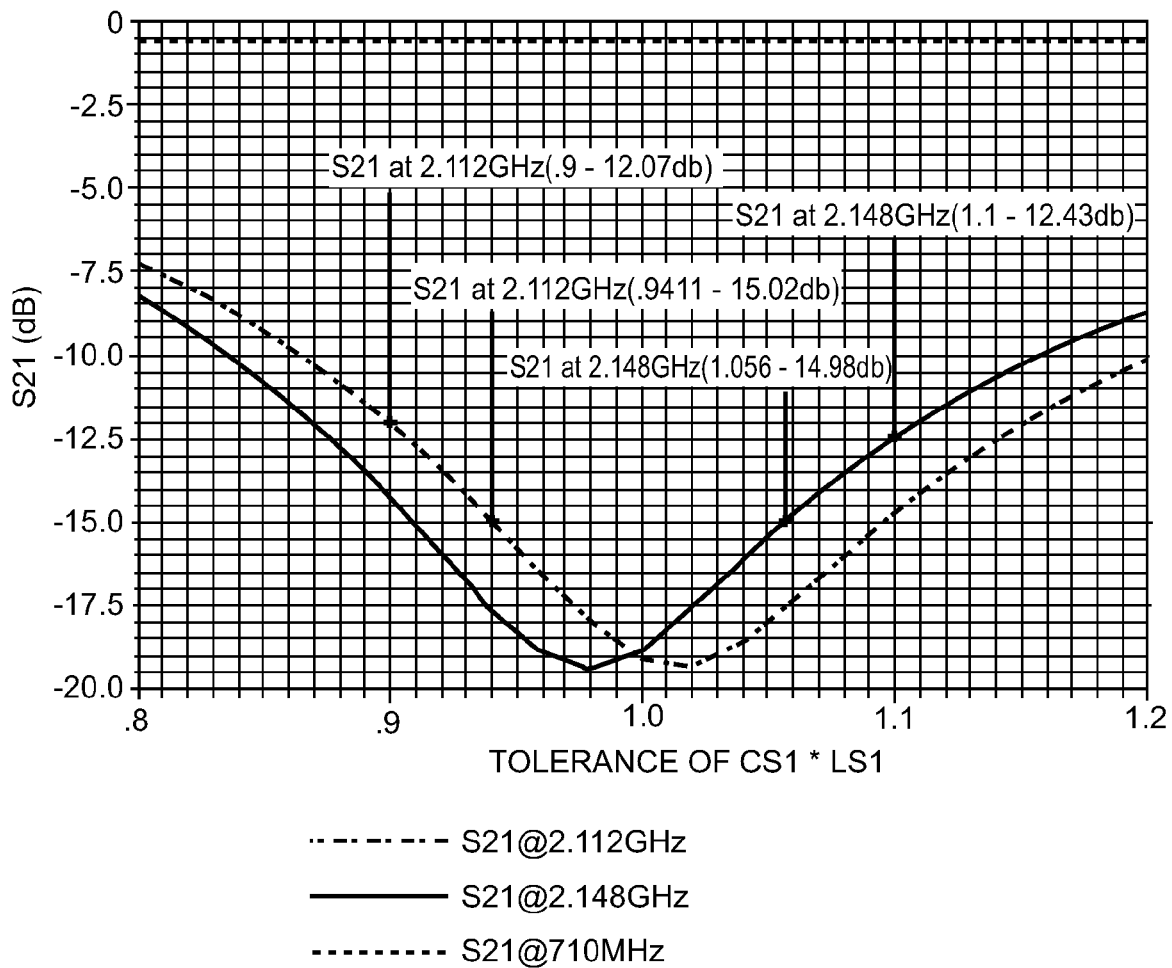
FIG. 16 is a graph illustrating an effect of changes in a series resonant notch filter's series capacitance and series inductance product on the attenuation at the third harmonic of the B17 signals that fall within a given band.

Tuning of the notch filter resonance may be needed to maintain attenuation of the third harmonic of the B17 TX signal and to compensate for a part to part tolerance of both capacitors inductors. FIG. 16 is a graph illustrating an effect of changes in a series resonant notch filter's CS1*LS1 product on the attenuation at the third harmonic of the B17 signals that fall within a given band. FIG. 16 graph uses the B4 RX band for an exemplary simulation that outputs the scattering parameter S21 as a function of tolerance for the CS1*LS1 product. In this example, if the CS1*LS1 product changes by 10%, the attenuation drops from 18 dB to 12 dB. In a typical implementation external high Q inductors with a tolerance of +/−5% would be suitable for the inductor LS1 and on-chip capacitors with a tolerance of +/−12% would be suitable as the capacitor CS1. The combined tolerance of the LC product is therefore +/−13%.

The antenna port of a phone is normally protected from ESD events by a shunt inductor to ground. This inductor may normally be a relatively high quality inductor and have a value of ~20 nH. In one embodiment, this ESD inductor may be used to form anti-resonance (parallel resonance) at the low band FTX frequency. This allows the elimination of a single purpose LP1, which reduces the insertion loss and financial cost associated with this component. As shown in FIG. 14, the inductor LP1 can also serve as the ESD inductor.

Desensitization of the B4 receiver in the 2112 MHz to 2148 MHz band can also occur in the high band RX path. The HB path is normally protected by the isolation provided by the dual feed antenna or diplex filter at the LB TX frequency. These components typically give sufficient attenuation of the LB TX signal for distortion in the HB path not to be of concern, however under severe antenna voltage standing wave ration (VSWR) conditions this isolation degraded to as little as 13 dB.

The low band B17 TX signal at 704-716 MHz can leak into the B4 HB RX path and distort in the receive components. A passive RX SAW filter will attenuate the B17 TX signal and protect the majority of the receive circuitry however the FE switch is left unprotected.

In one embodiment, a bypass-able tunable notch filter may be tuned to the B17 TX frequency on the antenna port of the HB FE switch. Preferably, a shunt series resonant tunable LC resonant circuit centered at the low band TX frequency. A parallel capacitor is usable to set up anti-resonance at the HB RX frequency to reduce insertion loss. This HB path notch filter arrangement may be used with either dual feed or diplex filter arrangements.

Figure 17:
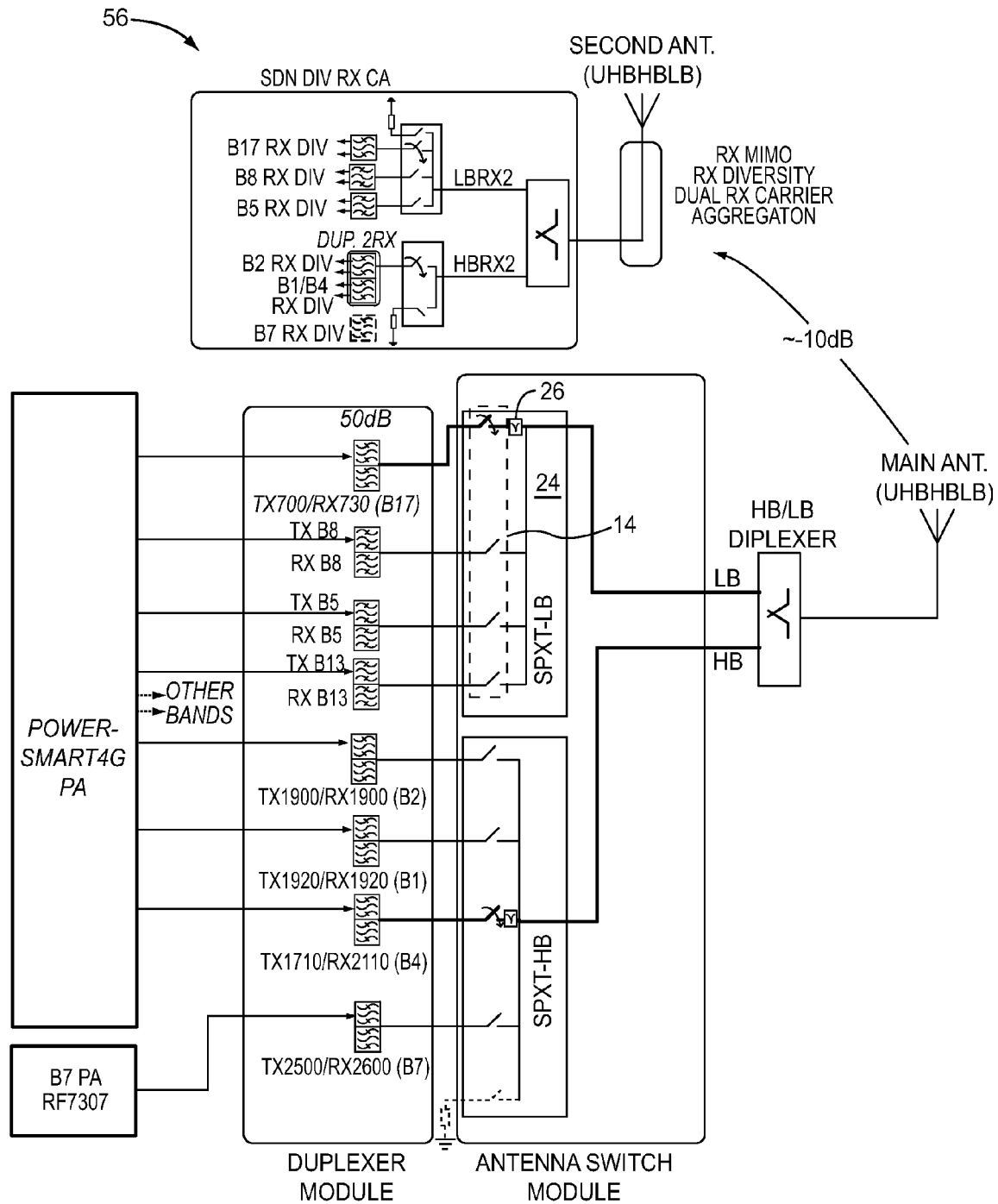
FIG. 17 is a general block diagram of a front end (FE) for a phone.

FIG. 17 is a general block diagram of a FE 56 for a phone (not shown). As shown in FIG. 16 the band switch 24 provides a notch in B17. The internal notch filter 26 is enabled by closing switch S1, opening switch S2, and opening switch S3. When the phone is not operating at frequencies where the third harmonic of the low band transmit signal may desensitize the high band receiver the notch filter can be disabled. This is done by opening switch S1, closing switch S2, and opening switch S3. The switch S2 is not strictly required, though is advisable in order to suppress any unwanted parasitic resonances.

FIG. 18 is a table that presents band switch performance without using a notch filter on the output 18 (FIGS. 1-3 and 13-15). If a transmission signal for a low band FTX_LB is one resource block (i.e. narrow band), the third harmonic of FTX_LB at a HB duplexer port is about −117 dBm/1 MHz or −177 dBm/1 Hz. In contrast, FIG. 19 is a table that presents band switch performance using a notch filter on the output 18 (FIGS. 1-3 and 13-15). If a transmission signal for a low band FTX_LB is one resource block (i.e., narrow band), the third harmonic of FTX_LB at a HB duplexer port is about −132 dBm/1 MHz or −192 dBm/1 Hz.

In regard to non 50 ohm antenna conditions, a change on antenna VSWR can affect the frequency location of the notch and thus the amount of attenuation provided by the switchable notch. Since most phones have a VSWR detection system typically based on directional couplers, in one embodiment the PAC value of the notch network is adjusted based on VSWR detection circuitries, where an RFIC would have a known relation of PAC variation relative to the VSWR change from a population of characterized radio units. Other techniques of calibration could be used instead where the PAC element is adjusted until the level of bit error rate (BER) is reduced within the modulator-demodulator (modem) of the phone, all of which are considered within the scope of the present disclosure.

Those skilled in the art will recognize improvements and modifications to the preferred embodiments of the present disclosure. For example, the band switches with bypass-able notch filters disclosed herein may also be used in a power amplifier band switch if the power amplifier is a broadband power amplifier supporting multi-mode and multi-band of operation requiring a switch at its output port (not shown in the figures). All such improvements and modifications are considered within the scope of the concepts disclosed herein and the claims that follow.

What is claimed is:

1. A band switch with a switchable notch for receive carrier aggregation comprising:
    at least one series switch coupled in series between at least one input and an output, and adapted to selectively couple the input to the output in response to a first control signal;
    at least one shunt switch coupled between the input and a voltage node, the at least one shunt switch being adapted to selectively couple the input to the voltage node in response to a second control signal; and
    at least one notch filter switchably coupled to the output in a shunt configuration, wherein the at least one notch filter comprise two sections that provide a second order notch.

2. The band switch of claim 1 further including a shunt output inductor coupled between the output and the voltage node, wherein the shunt output inductor provides electrostatic discharge protection as well as an additional resonating element for the at least one notch filter.

3. The band switch of claim 1 wherein the at least one notch filter is integrated with the band switch.

4. The band switch of claim 1 wherein the at least one series switch and/or at least one shunt switch is a micro-electromechanical systems (MEMS) switch.

5. The band switch of claim 1 wherein the at least one series switch and the at least one shunt switch are implemented using silicon-on-insulator (SOI), silicon-on-sapphire (SOS) or pseudomorphic high electron mobility transistor (pHemt) technology.

6. The band switch of claim 1 wherein a ratio of a parallel inductor and a parallel capacitor of one of the two sections and a ratio of a series inductor and a series capacitor of the other one of the two sections are selected to provide a series/parallel resonance at a given receive (RX) frequency to attenuate a third harmonic distortion generated in a transmit chain.

7. The band switch of claim 1 wherein the at least one notch filter comprises a series combination of a bypass switch that is adapted to open and close in response to a third control signal.

8. The band switch of claim 7 wherein the at least one notch filter comprises at least one capacitor and at least one inductor, wherein the at least one notch filter is configured to attenuate signals within a stop band range of frequencies determined by a value of the at least one capacitor and a value of the at least one inductor.

9. The band switch of claim 8 wherein the at least one capacitor is a programmable array of capacitors (PAC).

10. A front end (FE) for receive carrier aggregation comprising:
    a power amplifier (PA);
    a duplexer module; and
    at least one band switch comprising:
        at least one series switch coupled in series between at least one input and an output, and adapted to selectively couple the input to the output in response to a first control signal;
        at least one shunt switch coupled between the input and a voltage node, and adapted to selectively couple the input to the voltage node in response to a second control signal; and
        at least one notch filter switchably coupled to the output in a shunt configuration, wherein the at least one notch filter comprise two sections that provide a second order notch.

11. The FE of claim 10 further including a shunt output inductor coupled between the output and the voltage node, wherein the shunt output inductor provides electrostatic discharge protection as well as an additional resonating element for the at least one notch filter.

12. The FE of claim 10 wherein the at least one notch filter is integrated with the at least one band switch.

13. The FE of claim 10 wherein the at least one series switch and/or at least one shunt switch is a micro-electromechanical systems (MEMS) switch.

14. The FE of claim 10 wherein the at least one series switch and the at least one shunt switch are implemented using silicon-on-insulator (SOI), silicon-on-sapphire (SOS) or pseudomorphic high electron mobility transistor (pHemt) technology.

15. The FE of claim 10 wherein a ratio of a parallel inductor and a parallel capacitor of one of the two sections and a ratio of a series inductor and a series capacitor of the other one of the two sections are selected to provide a series/parallel resonance at a given receive (RX) frequency to attenuate a third harmonic distortion generated in a transmit chain.

16. The FE of claim 10 wherein the at least one notch filter comprises a series combination of a bypass switch that is adapted to open and close in response to a third control signal.

17. The FE of claim 16 wherein the at least one notch filter comprises at least one capacitor and at least one inductor, wherein the at least one notch filter is configured to attenuate signals within a stop band range of frequencies determined by a value of the at least one capacitor and a value of the at least one inductor.

18. The FE of claim 17 wherein the at least one capacitor is a programmable array of capacitors (PAC).

\* \* \* \* \*